United States Patent [19]

Knapp

[11] 3,752,377

[45] Aug. 14, 1973

[54] METHOD AND APPARATUS FOR CONTROLLING LATERAL SPACINGS OF ELONGATED ELEMENTS

[75] Inventor: George P. Knapp, Waban, Mass.

[73] Assignee: Mount Hope Machinery Company, Taunton, Mass.

[22] Filed: Sept. 1, 1972

[21] Appl. No.: 285,838

[52] U.S. Cl. .................................... 226/3, 226/17
[51] Int. Cl. ............................................ B65h 25/26
[58] Field of Search .................. 226/17, 21, 22, 23, 226/3; 26/67

[56] References Cited
UNITED STATES PATENTS

| | | | |
|---|---|---|---|
| 2,947,057 | 8/1960 | Meagher, Jr. et al. | 226/17 X |
| 3,156,396 | 11/1964 | Snyder et al. | 226/17 |
| 3,368,726 | 2/1968 | Funk et al. | 226/17 |
| 3,527,394 | 9/1970 | Alexeff | 226/17 |

Primary Examiner—Allen N. Knowles
Attorney—David A. Rich and William L. Ericson

[57] ABSTRACT

The spacings or relative lateral positions of elongated elements, such as tire cord or the warp threads of woven material, are controlled to obtain a uniform distribution. A pair of rolls are inclined at fixed angles to a plane in which the elements travel, to engage opposite edge portions of the web material with a wrap decreasing from the edges toward the center. The rolls are independently pivotable, on axes normal to their axes of rotation, to adjust their angles of cant relative to the length of the material, thereby to control their lateral pull. Detectors determine the count or spacing of the elements in regions near either edge, and may also compare the count or spacing of elements at the center of the material; alternatively, they may determine the positions of elements at either edge. The rolls are pivoted individually to adjust their cant angles as required to maintain desired spacings or relative lateral positions of the elongated elements.

20 Claims, 8 Drawing Figures

Patented Aug. 14, 1973                3,752,377
4 Sheets-Sheet 3
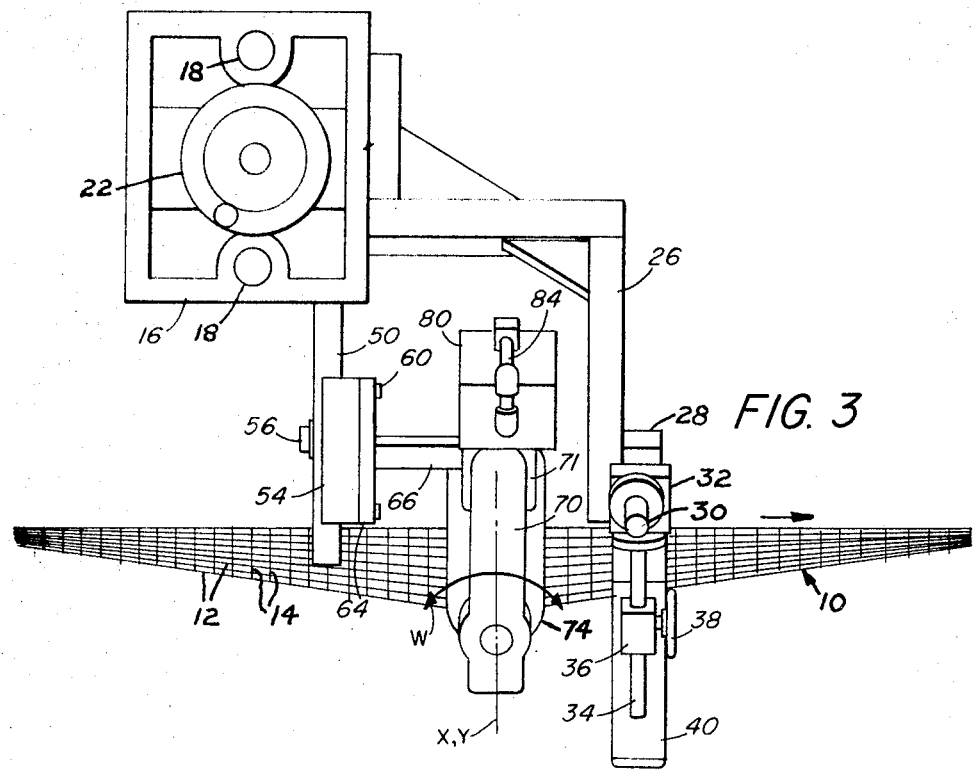
FIG. 3
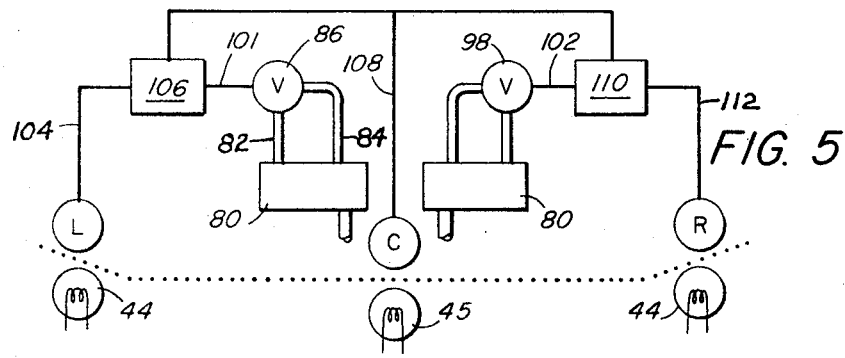
FIG. 4
FIG. 5

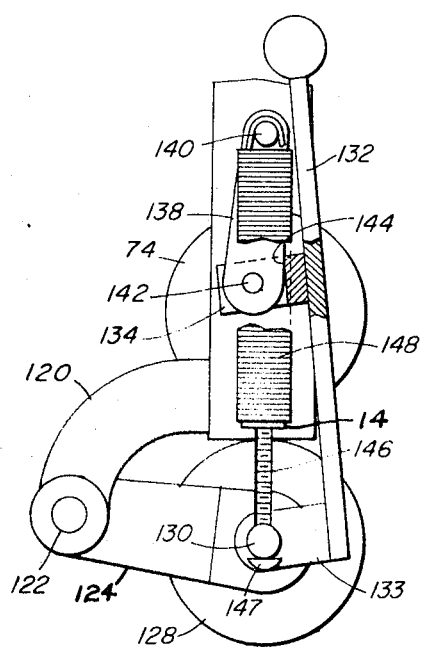
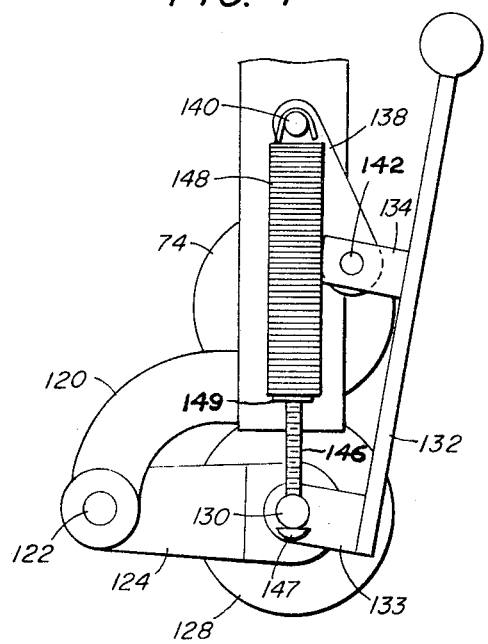
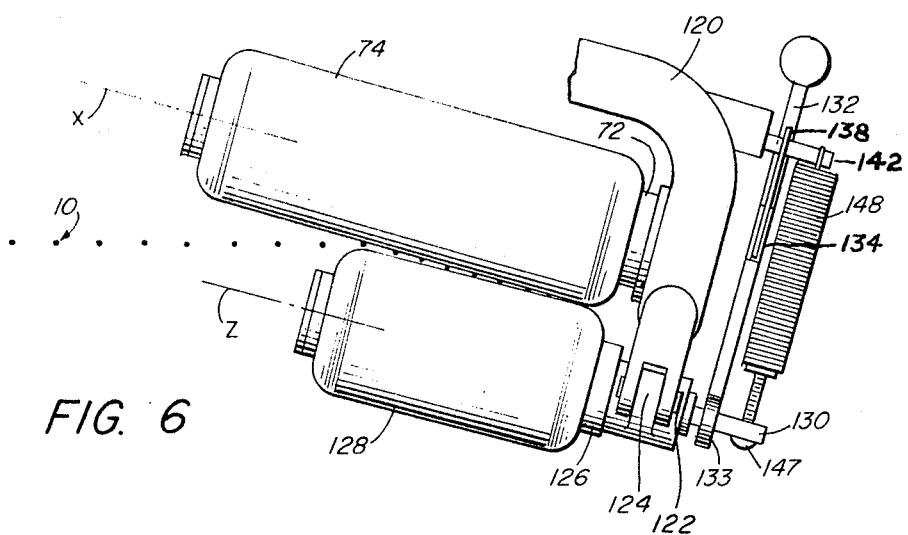

3,752,377

METHOD AND APPARATUS FOR CONTROLLING LATERAL SPACINGS OF ELONGATED ELEMENTS

BACKGROUND OF THE INVENTION

The processing of webs of tire cord, and other materials incorporating elongated elements, requires that the cords or other elements be distributed or spaced uniformly across the width of the material. Typically, a web of tire cord may have 30 cords per inch of width, and these are woven with relatively fine and widely spaced weft threads spaced about one-half inch apart, which merely serve to facilitate handling of the tire cord in the processing which precedes calendering. This processing consists generally of dipping, stretching and drying, during which the web is subjected to a substantial degree of tension; this tends to narrow the web. The cord spacing is reduced greatly in the vicinity of the edges of the web, but is relatively unaffected near the center. Before the cord enters the calender, where it is embedded in a sheet of uncured rubber and thereby has its width and cord spacing permanently fixed, the bunched cords near the edges of the web must be spread apart to a proper spacing. The cord spacing should be substantially uniform across the whole width of the web.

Prior art devices have spread tire cord webs by means of pairs of short rolls engaging opposite edge portions of the web, each inclined at a variable angle of tilt in a plane transverse to the length of the web and normal to its plane of travel. These rolls are also inclined in the plane of the web at a fixed cant angle to the width dimension of the web. The tilt of the rolls causes the web to wrap partially around them in such a manner that the angle of wrap varies progressively from a maximum at the edges of the web to zero at the tips of the rolls. The amount of lateral pull on the web by either roll is a function of the fixed cant angle and the variable tilt angle. By varying the tilt angle, the amount of wrap can be changed, thereby adjusting the lateral pull applied by either roll. Edge-position detectors control servo motors to adjust the tilt angle of each roll individually, thereby to pull the edges of the web to predetermined locations.

This method of varying the amount of wrap by changing the tilt angle, while maintaining a fixed cant angle, causes the edge of the web to be pulled outwardly until its lateral tension just causes it to slip on the rolls. The point at which this slippage will start is unpredictable, because it is affected by variations in longitudinal web tension and by changing characteristics of the web material. Therefore, frequent adjustments of the servomotors by the edge detectors are required, resulting in rapid wear of the mechanical parts. Further, the continuous slippage undesirably wears the surfaces of the rolls.

Control of cord spacing is achieved by the aforementioned method only to the degree that this is a function of overall web width, since no direct measurement of the actual spacing is employed. Consequently, the action may be to separate cords in some regions of the web more than in others.

Other prior art devices employed for web-edge guiding, such as that shown by U.S. Pat. No. 2,417,447 to J. D. Robertson, which is assigned to the assignee of this application, are not suitable for handling tire cord or the like webs. These devices employ two pairs of rolls each of which nips an edge portion of the web between them. Each pair of rolls has rotational axes parallel to the plane of travel of the web, and is pivotable about an axis normal to the web to vary its cant angle relative to the length of the web, thereby to adjust its degree of outward lateral pull on the gripped web edge. The rolls are parallel to the web rather than being tilted, so that there is no wrap of the web about the rolls; the grip therefore depends upon nipping the material between a pair of rolls. The consequence is that the nipped rolls exert an equal lateral pull on all of the longitudinal web elements which are nipped between them. Such a device cannot be employed with tire cord or similar webs because the pull on the cords nearer the center of the web would be excessive, breaking the delicate weft threads and thereby splitting and ruining the web. It is necessary instead to apply a progressively decreasing pull on cords spaced farther from the edges of the web, as is achieved by the single tilted-roll devices that were previously described.

BRIEF DESCRIPTION OF THE INVENTION

It is the primary object of the present invention to improve the uniformity of lateral spacing of elongated elements, especially in tire cord webs or other woven materials. It is a further object to provide an improved method and apparatus for controlling the relative lateral positions of longitudinal elements of web material. Further objects and advantages will appear as the following detailed description proceeds.

Briefly stated, the improved method entails the use of two rolls, one engaged with each edge of the web. The axis of rotation of each roll is tilted at a predetermined, fixed angle to the plane of travel of the web material, so as to wrap the web partially about the rolls with a wrap angle that decreases from a maximum at the edges to zero at the inner ends of the rolls. Each of the rolls is at the same time bodily pivotable about a second axis, which is inclined to the plane of the material and to the axis of rotation of the roll, preferably being normal to the latter. The angle of cant of each roll with respect to the width dimension of the web can thus be adjusted to independently control the lateral pull on either edge.

The pull on the edges of the web is a function both of the variable cant angle and the fixed tilt angle. The latter, which determines the amount of wrap of the web around the rolls, is chosen of a sufficient magnitude to insure that the rolls are capable of exerting the greatest pull that may at any time be required, with no slip of the web on the rolls. By changing the cant angle to control lateral pull, while holding a fixed tilt angle, the lateral positioning of web elements is thus accomplished without slippage, with the result that this random factor does not superimpose itself on the positioning control requirements, and a smoother, more uniform control of the web is attainable.

According to one aspect of the invention, the count or lateral spacing of the longitudinal cords or elements of the material is detected in regions spaced inwardly from its edges, by means of photoelectric cells, pneumatic detectors, or other equivalent devices capable of determined the proportion of an area occupied by these elements. These counts may be compared with a predetermined value to control the cant angles of the corresponding rolls; or an additional count made near the center of the web, where the lateral spacing of the cords is relatively unaffected by narrowing of the web, may be used as a standard for comparison. In another application of the invention, however, the specific positions of the cords at the edges of the web may be used to control the cant angles of the rolls, thus drawing the web to a specified width rather than to a particular cord spacing or count.

According to an optional feature of the invention, for use in cases where the longitudinal web tension is so great as to cause the web edges to curl over on themselves, each of the rolls may be supplemented by a second roll of relatively short length, which serves to nip the edge of the web against the first roll. However, the second rolls are not parallel to the first, but are set on skewed axes so that the grip between the rolls decreases from a maximum at the web edge to a minimum at the inner tips of the second rolls. This provides the graduated amount of lateral pull which is necessary, as previously explained, to avoid breaking the delicate weft threads and thus splitting the web.

DESCRIPTION OF THE DRAWINGS

While the specification concludes with claims particularly pointing out the subject matter which is regarded as the invention, it is believed that a clearer understanding may be gained from the following detailed description of preferred embodiments thereof, referring to the accompanying drawings, in which:

FIG. 3 is a view in side elevation;

FIG. 4 is a schematic view of one form of control system;

FIG. 5 is a schematic view of another form of control system;

FIG. 6 is a fragmentary plan view of a modified apparatus which includes a second pair of rolls; and FIGS. 7 and 8 are fragmentary views in side elevation of the apparatus of FIG. 6, showing mechanism for engaging the first and second rolls with one another, in nipped and de-nipped positions, respectively.

Figure 1:
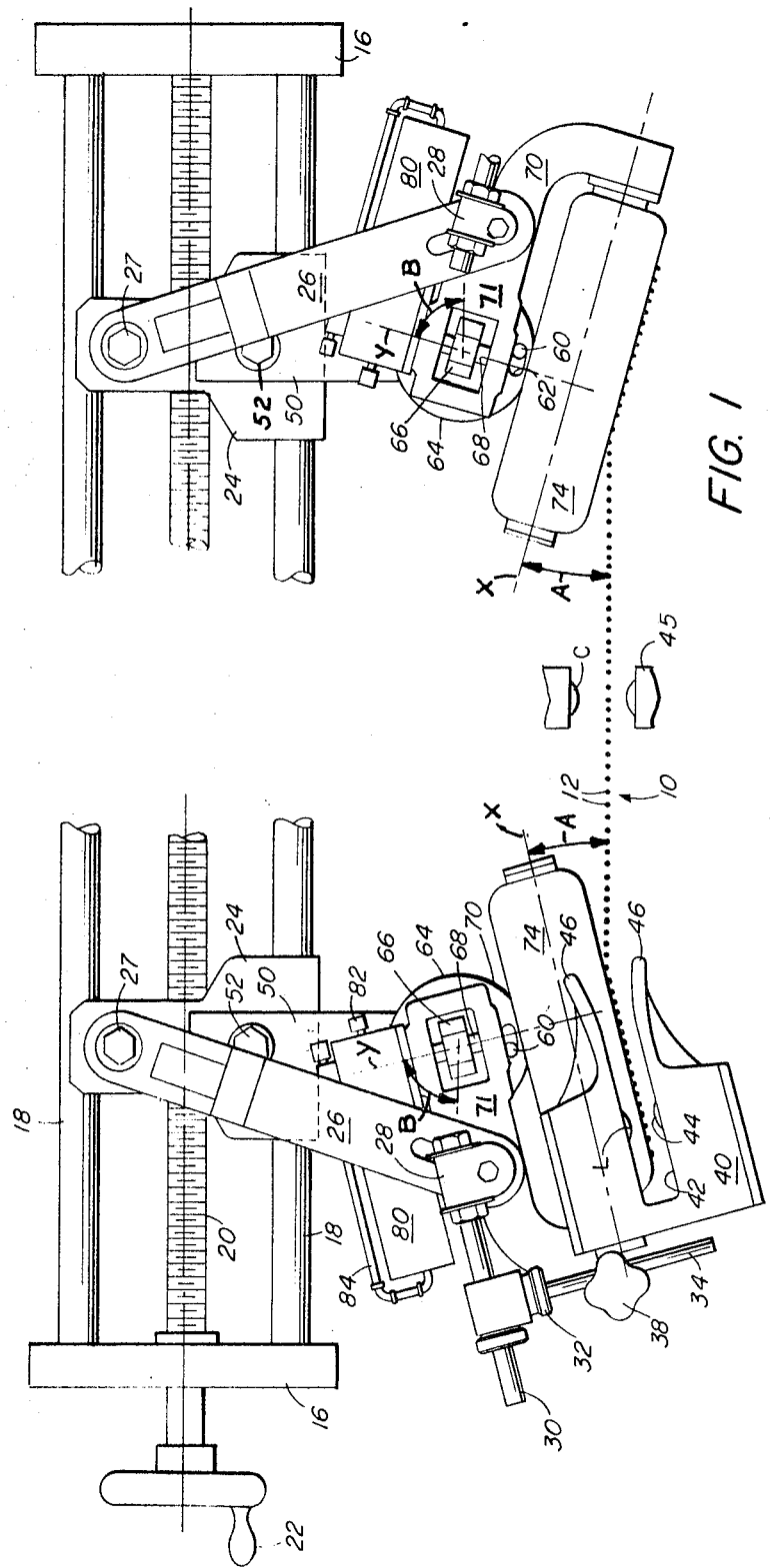
FIG. 1 is a fragmentary plan view of a first form of the improved apparatus.
Figure 2:
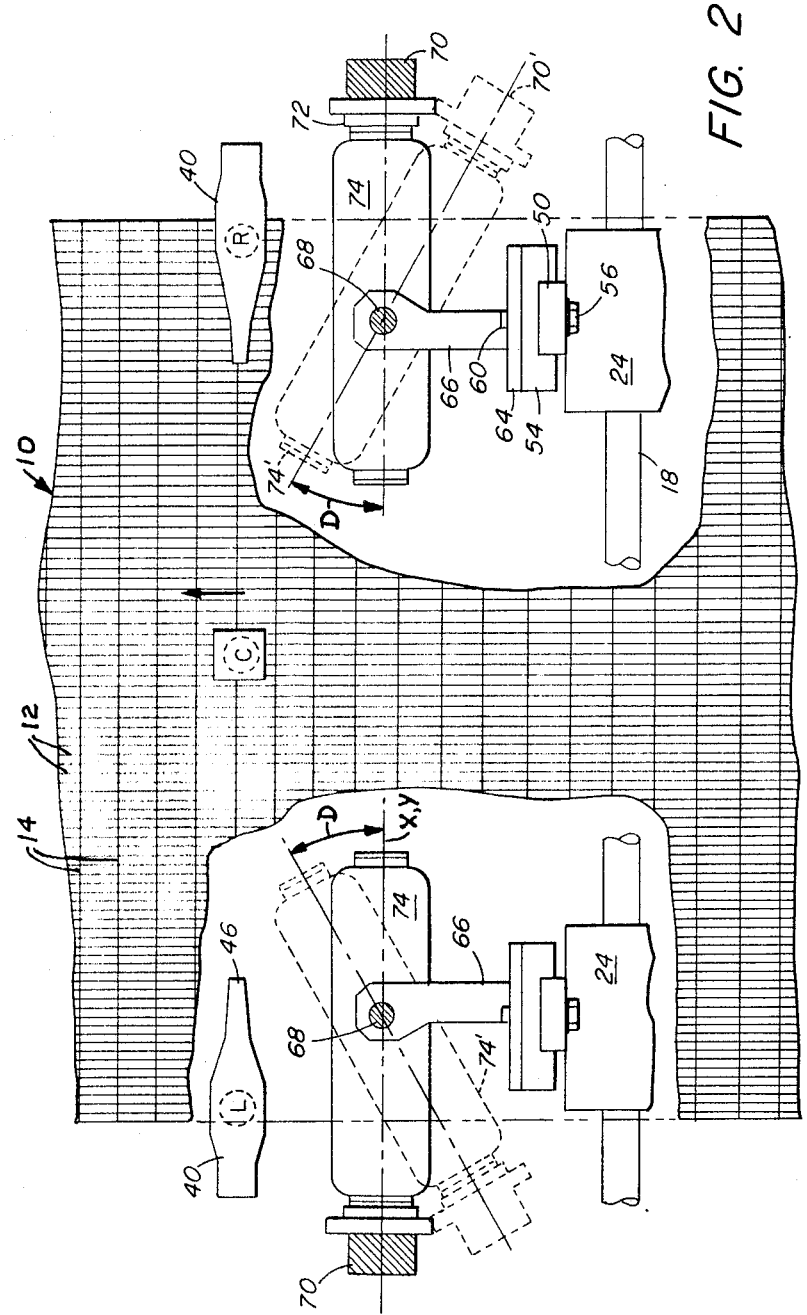
FIG. 2 is a fragmentary view in front elevation.

Referring first to FIGS. 1–3, the improved method is carried out by means of a pair of rolls 74, engaged with the opposite edges of a woven web 10 of indefinite length traveling in substantially the plane of FIG. 2, although a portion of the edges of the web are deflected from this plane by the rolls. As illustrated, the web consists of closely-spaced longitudinal or warp elements 12, which may comprise tire cords, and relatively widely-spaced and delicate weft threads 14, which merely serve to facilitate handling the cords 12 in those processes which precede calendering the cords into a sheet of uncured rubber. The improved method and apparatus are also well suited to the handling of other web materials incorporating elongated longitudinal or warp elements.

Each of the rolls 74 is considerably shorter than half the width of the web 10, and each is rotatably mounted on a first axis X by means of an axle 72 carried by an arm 70. The axes X are tilted with respect to the web at acute angles A lying in planes normal to the plane of the web and extending transversely to the length thereof. These angles are fixed, and are preferably sufficiently large to insure that the web will not slip on the rolls even when the latter exert a maximum lateral pull on the web.

The rolls 74 are thus projected partially into the edges of the web, which wraps about surface portions of the roll with a wrap angle which is at a maximum, illustrated at W in FIG. 3, at either edge of the web, and diminishes to zero where the rolls depart from the web near their inner ends. As the lateral pull of the rolls on the web depends in part upon the wrap angle, this pull diminishes uniformly from the edges to the points where the rolls depart from the web, as is necessary to obtain a graduated degree of spreading of the cords and thereby bring them to a uniform spacing without breaking the delicate and widely-spaced weft threads 14.

Each arm 70 terminates in a base portion 71, in which a roll-positioning shaft 68 is rotatably received. These shafts are fixed in arms 66 supported by the machine frame, and the arms 70 and rolls 74 are thus supported for pivotal adjusting movement about second axes Y. These axes lie in planes transverse to the plane of the web and preferably normal thereto; they are inclined to the plane of the web at an angle B (see FIG. 1), and preferably extend at right angles to the axes X. The rolls 74 are thus angularly adjustable to various cant angles with respect to the lateral dimension of the web. In FIG. 2 the rolls are shown in solid lines at 74 adjusted to a cant angle of 0°, that is, perpendicular to the length of the web, in which position they exert no lateral pull on the material; and are shown in dotted lines at 74', at a representative cant angle D, in which position they apply a substantial amount of outward pull on the edges of the material. Adjustment of the cant angles D, while maintaining the fixed tilt angles A, thus makes it possible to vary the lateral pull on each edge individually, and thereby to maintain the cords 12 in desired relative lateral positions or spacings.

The cant angles D are adjusted by servomotors, illustrated as double-acting fluid motors 80 of a commercially-available type, which are secured to the arms 70 and have rotary output means drivingly connected with the shafts 68. The motors 80 are reversible by supplying pressurized fluid selectively to conduits 82 or 84, thereby to reversibly adjust the cant angles D of the rolls 74.

The arms 70 and rolls 74 are mounted by the arms 66 in a manner to permit adjustment of the tilt angles A, as may be required to handle different widths or weights of web material. Each of the arms 66 is secured to a plate 64, having arcuate slots 62 receiving adjusting screws 60, which are threaded into a base 54. By this means, the tilt angles may be reset as required. The bases 54 are mounted by screws 56 on arms 50, which are in turn attached by screws 52 to brackets 24. The brackets are slidable on rods 18, which extend transversely of the machine and are supported on the machine frame (not shown) by mounting plates 16. To provide for lateral adjustment of the roll assemblies 70, 74 to accommodate various widths of web material, the brackets 24 are threadedly engaged on an adjusting shaft 20 having opposite threads at either side of the centerline of the machine, and rotatable by a hand-crank 22.

To control the adjustment of the cant angles of the rolls 74, detectors L and R, which may comprise photoelectric sensors, are supported by heads 40 adjacent to the left and right edges, respectively, of the web 10. In the form of the invention shown in FIGS. 1, 2, and 5, an additional detector C, which may also comprise a photoelectric sensor, is arranged to confront a central region of the web; however, this detector is omitted in another embodiment shown in FIG. 4. The detectors L, R, and C are confronted from the reverse face of the web by corresponding lamps 44 and 45.

The detector heads 40 are adjustably supported by manually-operable clamps 38 and 32 on rods 34 and 30, the latter being attached by clamps 28 to brackets 26, which are in turn secured by screws 27 to the brackets 24. The heads 40 are adjusted so that the slots 42 therein receive portions of the web departing from the rolls 74 between divergent jaws 46, with the edges of the web projecting into slots 42 of the jaws. The slots are inclined at substantially the same angles as the tilt angles A of the rolls, to pass the web edges in substantial parallelism with the sides of the slots. As the rolls 74 are canted back and forth around the axes Y, they remain in planes tangent to the engaged edges of the web, which are distorted to a complex curvature by their wrap about the rolls. The parallelism of the web edges with respect to the slots 42 will therefore be somewhat disturbed by the canting of the rolls, but this is not material so long as the slots are wide enough to avoid rubbing against the web.

According to one mode of practice of the invention, the photoelectric sensors L and R are positioned somewhat inside the edges of the web 10, for the purpose of detecting the count or relative lateral spacing of the cords 12 in these vicinities. The intensity of light transmitted to the sensors by the lamps 44 is a function of the area of the sensors which is exposed through the openings between the cords 12, as opposed to the area occluded by cords; and the signal produced by the sensors therefore is a measure of the count of cords per unit of lateral distance. In the event that the optional sensor C is employed, it similarly produces a signal which is a measure of the cord count in the vicinity of the web center. However, the sensors may alternatively be positioned at the edges of the web, and used in a conventional manner to determine the lateral locations of the edges, that is to say, the specific positions of the outermost cords or elements. Suitable types of conventional pneumatic, electrical, or mechanical sensors may be substituted for the illustrated photoelectric types, as appropriate to the choice made whether to detect cord spacing or relative positioning within the web, or to detect cord positions at the edges.

A first form of cant angle control system is shown in FIG. 4, which utilizes only two sensors L and R. The output signals are supplied by leads 92 and 96 to control circuits 90 and 94, respectively, which compare the values of these signals with fixed reference signals corresponding to predetermined desired cord counts, or optionally with predetermined desired web edge positions, according to alternatives previously explained. Signals representing deviations from the desired counts or positions are supplied by the circuits 90 and 94 through leads 101 and 102 to electrically-controlled valves 86 and 98, respectively. These signals thereby control the delivery or non-delivery of pressurized fluid from supply conduits 88 and 100 to either of the conduits 82 or 84 of the servomotors 80. The output shafts 68 are thus angularly positioned in response to the detected parameters.

The servomotors 80 and controls 90, 94 are so arranged that an increase in cord count near either edge of the web, or alternatively an inward movement of the web edge, either of which represents a narrowing and bunching tendency of the web, turns the roll 74 at that edge to an increased cant angle D, thereby increasing the outward lateral pull on the web edge to overcome that tendency. Conversely, a decrease in cord count, or an outward movement of the web edge, results in angular adjustment of the corresponding roll to a decreased cant angle to correct the error by reducing the outward pull on that edge.

An alternative control system is shown in FIG. 5, which incorporates the sensor C at the center of the web. In this case a reference signal representing the cord count in the center is passed by a branched lead 108 to each of two control circuits 106 and 110. The former circuit compares the reference signal with the signal received through a lead 104 from the sensor L, while the latter compares the reference signal with that supplied from the sensor R via a lead 112. Signals representing deviations of the edge cord count from the reference center cord count are supplied by the circuits 106 and 110 through leads 101 and 102 to elements similar to those of FIG. 4, and these elements are similarly numbered. They are so arranged that a relative increase in cord count near either edge results in an increase in the cant angle D of the roll 74 at that edge to pull it out more vigorously, while a relatively declining cord count reduces the cant angle to relieve the outward tension. Since the cord spacing near the center of the web is relatively unaffected by processing, it serves as a satisfactory reference standard.

Certain types of tire cord or other fabrics have an observable tendency for the cords near the edges to roll inwardly over the body of the fabric, especially when relatively high longitudinal tension must be applied to carry out a process. An alternative embodiment which overcomes this curling tendency is illustrated in FIGS. 6–8. Rolls 74 are rotatably supported on axes X by means of bearings 72 carried by arms 120, which are mounted as in the preceding embodiments to support the rolls at fixed tilt angles and adjustable cant angles with respect to the opposite edges of the fabric web 10. However, each of the rolls 74 is supplemented by a relatively short second roll 128, to nip the edges of the fabric and thus prevent any curling from developing. The rolls 128 are made shorter than the rolls 74 to avoid projecting their tips into the fabric, which might rupture the weft threads. Each roll 128 is rotatably mounted by means of a bearing 126 carried by an arm 124. Each arm 124 is pivotally mounted by a pin 122 on the arm 120 to permit de-nipping of the rolls, so that the fabric may be inserted in or removed from the nip between the rolls.

The rotational axis Z of each roll 128 is set at a slightly skewed angle to the axis X of the mating roll 74 so that the two rolls diverge slightly toward their tips. This avoids the tendency of nipped rolls set on parallel axes to exert a constant outward spreading force on each cord, which would damage the web. Instead, the spreading force diminishes progressively from the edges toward the center of the web, as is necessary to avoid breaking the delicate weft threads.

Mechanism for nipping or de-nipping the rolls 74 and 128 includes a hand lever 132, shown in the de-nipping position in FIG. 8 and in the nipping position in FIG. 7. The lever has transverse ears 133 and 134, the former being pivotally connected by a pin 130 with the movable end of the arm 124 bearing the roll 128, and the latter being pivotally connected by a pin 142 with a link 138. This link is in turn pivotally mounted on the arm 120 by a pin 140. The link 138, lever 132, and arm 124 thus form a toggle linkage having fixed pivot points at 122 and 140.

A tension spring 148 is hooked about the pin 140, and its opposite end is secured by an adjusting screw 146 passing through the pin 130 and terminating in a head 147. The screw 146 is threaded in a nut 149 attached to the free end of the spring 148 to provide for adjustment of the spring tension. The spring 148 continuously biases the roll 128 toward engagement with the roll 74.

The toggle linkage including the hand lever 132 is shown in FIG. 7 in a position which permits nipping engagement of the rolls.

Movement of the lever 132 to the position of FIG. 8 passes the pin 142 to an over-center position with respect to a centerline connecting the pins 140 and 130, i.e. the centerline of the spring 148. The roll 128 is held by spring tension in this de-nipped position by an interference between the link 138 and the root of a slot 144 formed in the ear 134 of the lever 132.

I claim:

1. Web guiding apparatus for acting on an indefinite length of web material traveling longitudinally substantially in a plane and including longitudinal elements of indefinite length, said apparatus comprising:
    a pair of rolls;
    a pair of means supporting said rolls one in engagement with each of the edge portions of the material, each of said supporting means mounting a corresponding roll for rotation on a first axis transverse to the length of the material and inclined at a predetermined angle to the plane of the material, to engage each of said rolls with a surface of the material each with a wrap decreasing from a maximum at the edges of the material to a minimum at the ends of the rolls nearest the center of the length of material;
    each of said supporting means being pivotally supported on a second axis inclined to said first axis and to the plane of the material, for angular adjusting movement of said supporting means and said rolls about said second axes;
    means for detecting relative lateral positions of longitudinal elements of the material;
    and positioning means drivingly connected with said supporting means and operatively connected with said detecting means for response thereto to independently adjust the angular positions of said supporting means and said rolls about said second axes to independently control the lateral pull of each roll on the material and thereby maintain predetermined relative lateral positions of longitudinal elements of the material.

2. Apparatus as recited in claim 1, each of said second axes extending substantially normal to a corresponding one of said first axes, whereby each of said rolls is angularly adjustable in a plane substantially tangent to its area of engagement with the material.

3. Apparatus as recited in claim 1, each of said second axes lying in a plane substantially normal to said longitudinal elements of the material.

4. Apparatus as recited in claim 1, each of said first axes being inclined at a predetermined angle which forms a wrap of the material about said rolls preventing slippage of the material longitudinally on said rolls.

5. Apparatus as recited in claim 1, said detecting means being constructed and arranged to detect the lateral counts of said longitudinal elements in the vicinities of the opposite edge portions of the material;
    said positioning means being operative in response to said detecting means to adjust said rolls about said second axes to maintain the lateral counts of said longitudinal elements substantially at equal predetermined values in the vicinities of the opposite edge portions of the material.

6. Apparatus as recited in claim 1, said detecting means being constructed and arranged to detect the relative lateral spacing of said longitudinal elements in the vicinities of the opposite edge portions of the material;
    said positioning means being operative in response to detection of increased or decreased spacing, respectively, between said longitudinal elements near either edge portion, to adjust one of said rolls adjacent that edge portion about said second axis thereof to a position in which said one of said rolls applies decreased or increased lateral pull, respectively, on the edge of the material engaged thereby.

7. Apparatus as recited in claim 1, said detecting means being constructed and arranged to detect the lateral counts of said longitudinal elements in the vicinities of the center and the opposite edges of the material;
    said positioning means being operative in response to said detecting means to adjust said rolls about said second axes to maintain the lateral counts of said longitudinal elements in the vicinities of said opposite edges substantially equal to the lateral distribution of said longitudinal elements in the vicinity of the center of the material.

8. Apparatus as recited in claim 1, said detecting means being constructed and arranged to detect the relative lateral spacing of said longitudinal elements in the vicinities of the center and the opposite edges of the material, and to compare the distributions of elements in the center with those of each edge separately;
    said positioning means being operative in response to greater or lesser spacing, respectively, between said longitudinal elements near either edge portion than between those in the center of the material, to adjust one of said rolls adjacent that edge portion about said second axis thereof to a position in which said one of said rolls applies decreased or increased lateral pull, respectively, on the edge of the material engaged thereby.

9. Apparatus as recited in claim 1, said detecting means being constructed and arranged to detect the lateral positions of longitudinal elements at the opposite edges of the material;
    said positioning means being operative in response to said detecting means to adjust said rolls to maintain said longitudinal elements at the opposite edges of the material substantially in predetermined lateral positions.

10. Apparatus as recited in claim 1, together with a second pair of rolls each rotatably supported by a corresponding one of said supporting means and engageable with a surface of the material opposite said first-mentioned surface to nip the edges of the material against said first-mentioned rolls for preventing edge curling.

11. Apparatus as recited in claim 10, said supporting means mounting each of said second rolls for rotation on an axis extending at an angle to said first axis of a corresponding one of said first-mentioned rolls such that said first and second rolls nip the material with maximum pressure at its edges and with decreasing pressure toward the ends of said rolls nearest the center of the material, to apply a graduated amount of lateral pull on various longitudinal elements of the material gripped between said rolls.

12. Apparatus as recited in claim 10, said supporting means mounting each of said second rolls for rotation on an axis lying in a common plane with said first axis of a corresponding one of said first rolls, each said common plane being substantially normal to said plane of the material.

13. Apparatus as recited in claim 10, said second rolls being of shorter length than said first rolls and having ends terminating short of ends of said first rolls nearest the center of the material.

14. Web guiding apparatus for acting on an indefinite length of web material traveling longitudinally substantially in a plane and including longitudinal elements of indefinite length, said apparatus comprising:
a pair of rolls;
a pair of means each supporting one of said rolls in engagement with a different edge portion of the material, each of said supporting means mounting one of said rolls for rotation on a first axis transverse to the length of the material and inclined at a predetermined fixed angle of tilt with respect to the plane of the material, to engage each of said rolls with a surface of the material each with a wrap angle decreasing from a predetermined maximum at the edges of the material to a predetermined minimum at the ends of the rolls nearest the center of the length of material;
each of said supporting means being pivotally supported on a second axis substantially normal to said first axis and inclined to the plane of the material, for independent canting movement of each said supporting means and roll, in a plane tangent to the area of engagement between the roll and the material, about said second axes, to various cant angles in which said rolls exert various amounts of outward lateral pull on the material;
means for detecting relative lateral spacings of longitudinal elements of the material in different laterally-spaced regions thereof;
and positioning means drivingly connected with said supporting means and operatively connected with said detecting means for response thereto to independently adjust the cant angles of each of said supporting means and the corresponding said roll to independently control the lateral pull of each said roll on the material and thereby maintain predetermined relative lateral spacings of longitudinal elements of the material in said different regions thereof.

15. The method of maintaining predetermined relative lateral positions of longitudinal elements of an indefinite length of web material traveling longitudinally substantially in a plane, which comprises the steps of:
engaging opposite edge portions of the material each with one of a pair of rolls, and permitting the rolls to be rotationally driven about first axes thereof by their engagement with the material, while inclining said rolls and said first axes thereof at predetermined angles of tilt to the plane of the material;
while determining the relative lateral positions of longitudinal elements of the material in different laterally-spaced regions of the material;
and canting said rolls individually, each about a second axis inclined to said first axis thereof and to the plane of the material, in response to changes in the relative lateral positions of longitudinal elements of the material, in a manner to adjust the relative laterally-outward pull of said rolls as required to substantially maintain predetermined relative lateral positions of said longitudinal elements of the material in said different regions.

16. The method recited in claim 15, in which the step of canting said rolls is carried out with said second axes extending substantially normal to said first axes of said rolls, whereby each of said rolls is pivoted in a plane substantially tangent to its area of engagement with the material.

17. The method recited in claim 15, in which the step of determining the relative positions of elements of the material is carried out by determining the lateral counts of elements in the vicinities of the opposite edge portions of the material, and the step of canting said rolls is carried out in a manner to maintain predetermined substantially equal counts of elements in said vicinities.

18. The method recited in claim 15, in which the step of determining the relative positions of elements ef the material is carried out by determining the lateral counts of elements in the vicinities of the center and the opposite edge portions of the material, and the step of canting said rolls is carried out in a manner to maintain the counts of elements in the edge portions substantially equal to the count of elements in the center of the material.

19. The method recited in claim 15, in which the step of determining the relative positions of elements of the material is carried out by determining the lateral positions of elements at the opposite edges of the material, and the step of canting said rolls is carried out in a manner to maintain said elements substantially in predetermined lateral positions.

20. The method recited in claim 15, in which the step of canting said rolls is carried out with each of said second axes lying in a plane substantially normal to said longitudinal elements of the material.

* * * * *